United States Patent

[11] 3,527,186

[72] Inventors Peder K. Wennberg
 Sands Point, New York;
 Uffe Hornsyld, Huntington, New York;
 Francis West, Jr., Sea Cliff, New York
[21] Appl. No. 737,224
[22] Filed June 14, 1968
[45] Patented Sept. 8, 1970
[73] Assignee Propulsion Systems, Inc.
 Port Washington, New York
 a corporation of New York

[54] VARIABLE RATE ELECTROHYDRAULIC ACTUATOR SYSTEMS, PARTICULARLY FOR SHIP'S STEERING AND/OR PROPELLER PITCH CONTROL
 22 Claims, 6 Drawing Figs.
[52] U.S. Cl. .................................................. 114/144
[51] Int. Cl. ...................................................... B63h 25/00
[50] Field of Search ......................................... 114/150;
 170/160.32; 91/459; 60/525

[56] References Cited
UNITED STATES PATENTS

| | | | | |
|---|---|---|---|---|
| 2,419,812 | 4/1947 | Bedford | | 318/20.430 |
| 2,940,263 | 6/1960 | Cudnohufsky | | 91/459X |
| 3,154,921 | 11/1964 | Junck et al. | | 60/52 |
| 3,216,331 | 11/1965 | Kreuter | | 91/459 |
| 3,242,407 | 3/1966 | Hansen | | 318/20.430X |
| 3,404,856 | 10/1968 | Gerstine | | 244/77 |
| 3,447,783 | 6/1969 | Wijkander | | 170/160.32 |

Primary Examiner—Andrew H. Farrell
Attorney—Larson, Taylor & Hinds

ABSTRACT: A variable rate electrohydraulic actuator system drives a ship's hydraulic steering motor and/or propeller pitch control motor at variable rates. Magnetic amplifiers of different output sensitivities have their inputs connected preferably in series with the command signal source but respond selectively thereto, such that each amplifier and its associated relay will cut in an associated constant delivery pump so as to drive the hydraulic motor at the rate indicated by the command signal. The amplifiers are arranged in a D.C. bridge circuit formed by command and feedback potentiometers. In the pitch changing system, the bridge further includes a rheostat which is set by a propulsion engine governor so as to be indicative of the load condition on the engine. Under overload conditions, the rheostat biasses the circuit in a pitch reducing sense. The electrical location of the rheostat in the circuit is automatically changed upon going from forward to astern pitch, or vice versa. A single command lever is operative to drive programmed cams which vary both engine speed and propeller pitch in accordance with a predetermined program. Especially in the pitch changing system, the distributor valve for the hydraulic motor comprises a servo valve which is hydraulically stroked by a pilot valve, and the spool of the servo valve is connected to the ported sleeve of the pilot valve so as to ensure precise followup.

INVENTORS
PEDER K. WENNBERG
UFFE HORNSYLD
FRANCIS WEST, JR.
BY *Larson and Taylor*
ATTORNEYS

INVENTORS
PEDER K. WENNBERG
UFFE HORNSYLD
FRANCIS WEST, JR.

ATTORNEYS

INVENTORS
PEDER K. WENNBERG
UFFE HORNSYLD
FRANCIS WEST, JR.

BY Larson and Taylor
ATTORNEYS

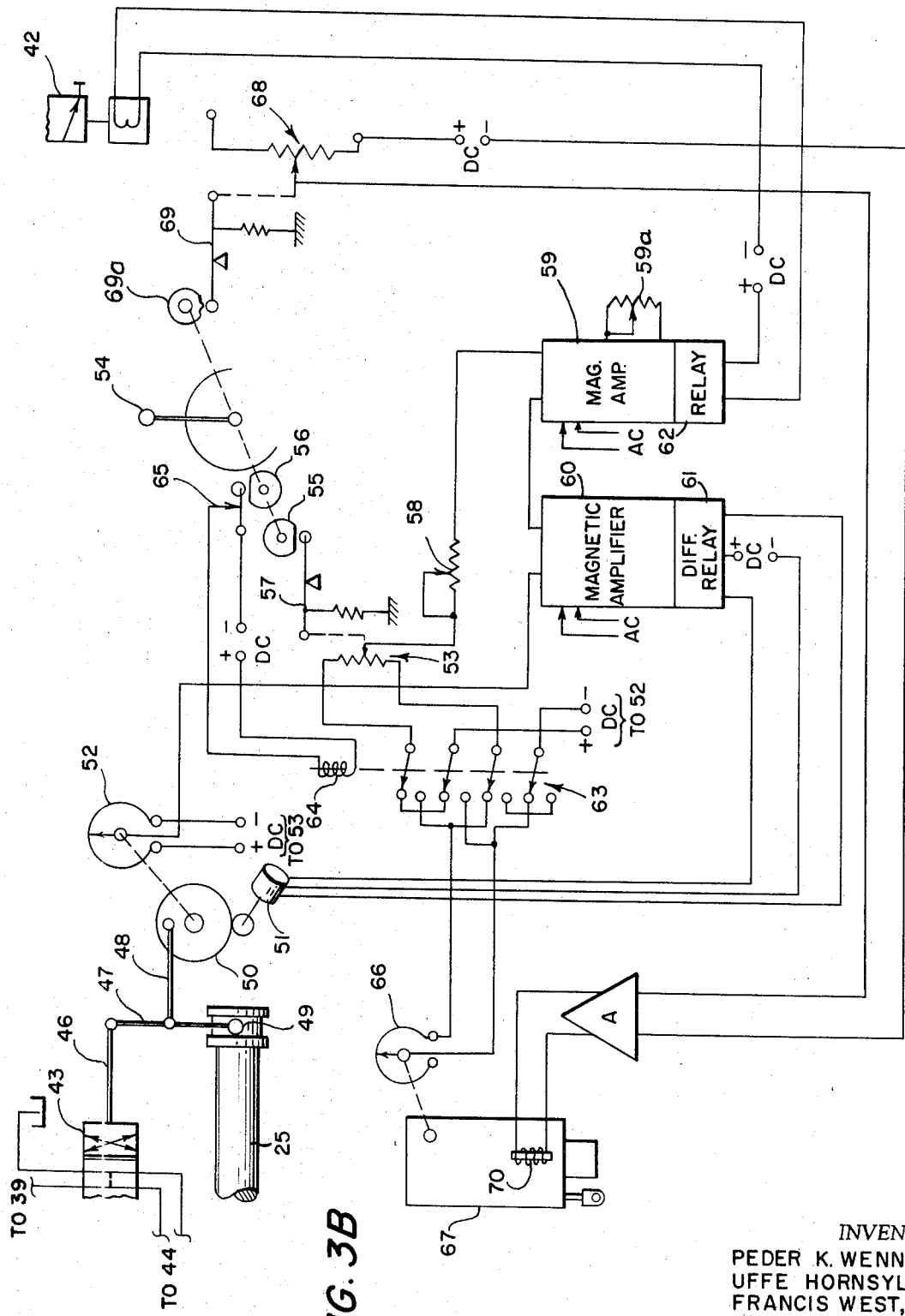

VARIABLE RATE ELECTROHYDRAULIC ACTUATOR SYSTEMS, PARTICULARLY FOR SHIP'S STEERING AND/OR PROPELLER PITCH CONTROL

FIELD OF THE INVENTION

This invention relates to electrohydraulic control systems, especially steering systems and propeller pitch control systems for marine vessels. More particularly, the invention relates to dual rate or variable rate electrohydraulic actuator systems for controlling the steering motors or the propeller pitch changing motors of such vessels.

BACKGROUND AND SUMMARY OF THE INVENTION

There are many instances where a hydraulic motor must be driven at variable rates but with precise control. There are many ways of achieving variable rate motor operation, for example, by using variable delivery pumps. It is an object of this invention to achieve variable rate operation through an improved system which can use inexpensive constant delivery pumps by rendering them selectively responsive to the same source of variable command signals in such a way as to obtain variable but precise operation of the motor.

In order to utilize the many advantages of a controllable pitch propeller, the control system must be capable of extremely precise pitch positioning, as well as very rapid pitch changes to facilitate vessel maneuvering. It should also be capable of reducing the pitch automatically to relieve propulsion engine overload while maintaining engine speed, and to provide an exact program of engine speed versus pitch angle from full ahead to full astern. High accuracy in pitch positioning is required, as a small change in pitch represents a relatively large change in engine power demand, especially through the high ranges of pitch and speed. It is an object of this invention to provide a control system which embodies all of these capabilities and advantages.

As in the controllable pitch propeller system, the steering control system of a vessel must be capable of extremely precise rudder positioning, as well as very rapid rudder changes to facilitate vessel maneuvering. There is little if any difficulty in providing a system which adequately satisfies one of these requirements, but since rapidity and preciseness are basically conflicting requirements, many control systems achieve one characteristic at the expense of the other. It is a general object of this invention to provide a variable speed rudder control system which fully achieves simultaneously the capabilities of rapidity and preciseness.

In accordance with the invention, as applied to a hydraulic steering motor or to a hydraulic pitch control motor, an actuator system is provided which achieves variable rate control with a combination of relatively inexpensive constant delivery pumps which are arranged to respond selectively to common command signals. In the preferred arrangement, this is achieved by subjecting to the same command signal at least two pump controlling amplifier systems of different output sensitivities so as to be selectively responsive to signals of different magnitudes. Preferably a low volume pump starts and stops the motor movement, thus allowing very precise positioning of the motor, while a high volume pump is cut in at the proper time to allow rapid movement of the motor. To avoid or at least minimize synchronization difficulties, the pump controlling amplifiers in a system are located in circuit with a single command signal source, such as bridge connected command and feedback potentiometers. To further minimize or avoid synchronization difficulties, and to improve control over the exact cut-in and cut-out timing of the high volume pump, the amplifiers are connected with their inputs in series so that each will always be subjected to the same command signal as the other. The amplifiers control relays which in turn control the pump valves for bypassing the pump outputs or directing the outputs to the motor. One of the relays, in a known manner, is a differential relay which actuates a selector valve for directing the pump output or outputs to the proper side of the motor so as to drive the motor in the commanded direction as well as at the commanded rate. In the preferred embodiment, the output of the high volume constant delivery pump is directed to the motor when the net command signal exceeds a predetermined value, for instance, a value indicative of a difference of 5° or more between actual motor position and commanded motor position.

In the propeller pitch control embodiment of the invention, there preferably is included an engine overload protective arrangement. In its preferred form, this protective arrangement comprises a rheostat which is controlled by an engine load sensing governor such that the setting of the rheostat is indicative of the load condition of the propulsion engine, and hence is indicative of an overload condition when a predetermined rheostat setting occurs. As mentioned above, the command and feedback potentiometers and the amplifiers are connected in a bridge circuit, and the overload rheostat is connected in the bridge so as to bias the bridge circuit in a pitch reducing sense in response to an overload condition of the engine. To render this protective feature operative during both astern and ahead pitch conditions, a relay automatically functions to connect the rheostat in the proper electrical location for the particular pitch condition. For instance, by connecting the rheostat in series with one side of the command potentiometer, it will be effective to reduce pitch to relieve engine overload during, for instance, ahead pitch conditions. To render it effective during astern pitch conditions, the relay automatically responds to movement of the command lever to connect the rheostat on the other side of the command potentiometer.

Also in the pitch controlling embodiment of the invention, the pitch command potentiometer preferably is driven through a cam arrangement which in turn is controlled by the command lever. In addition to the pitch cam and a cam for operating the relay to shift the electrical location of the overload rheostat, the command lever preferably drives a further cam arrangement which controls the engine speed. The various cams are designed so as to control the pitch and the speed in a programmed manner and hence the speed and the pitch are always varied in accordance with the program, except when the overload rheostat biasses the control circuit to reduce the pitch so as to relieve engine overload. The single lever control and the programmed relationship between pitch and speed greatly simplify the control of the vessel.

In either embodiment of the invention, the directional valve for directing the pump output or outputs to the proper side of the motor may advantageously be an improved compound valve consisting of a servo valve which is hydraulically stroked by a pilot valve, the pilot valve in turn being stroked by a servo motor of the command system. In the preferred form of the valve, the pilot valve has a ported internal sleeve which is connected to the spool of the servo valve for followup, so that the servo valve spool follows exactly any movement of the pilot valve spool.

In accordance with the foregoing, it will be apparent that it is a general object of this invention to provide a variable rate electrohydraulic actuator system, particularly for ship's steering and/or propeller pitch control systems, and that more particular objects of this invention reside in the provision of improved such systems incorporating one or more of the foregoing additional features, capabilities and advantages. Other and further objects, advantages and features of the invention will be apparent to those skilled in the art from the ensuing description of exemplary preferred embodiments and the corresponding illustrations set forth in the accompanying drawings.

We have set forth with particularity and distinctness in the appended claims those features which we consider to be characteristic of our invention, but the invention itself, its construction and arrangement, as well as the manner of use and operation thereof, will be best understood from the exemplary descriptions and illustrations to follow.

BRIEF DESCRIPTION OF THE DRAWINGS

FIGS. 3A and 3B together constitute a schematic diagram of a variable rate propeller pitch control system in accordance with the invention, some components of the system being shown in each figure so as to facilitate interrelating the two figures.

DESCRIPTION OF THE PREFERRED EMBODIMENTS

Figure 1:
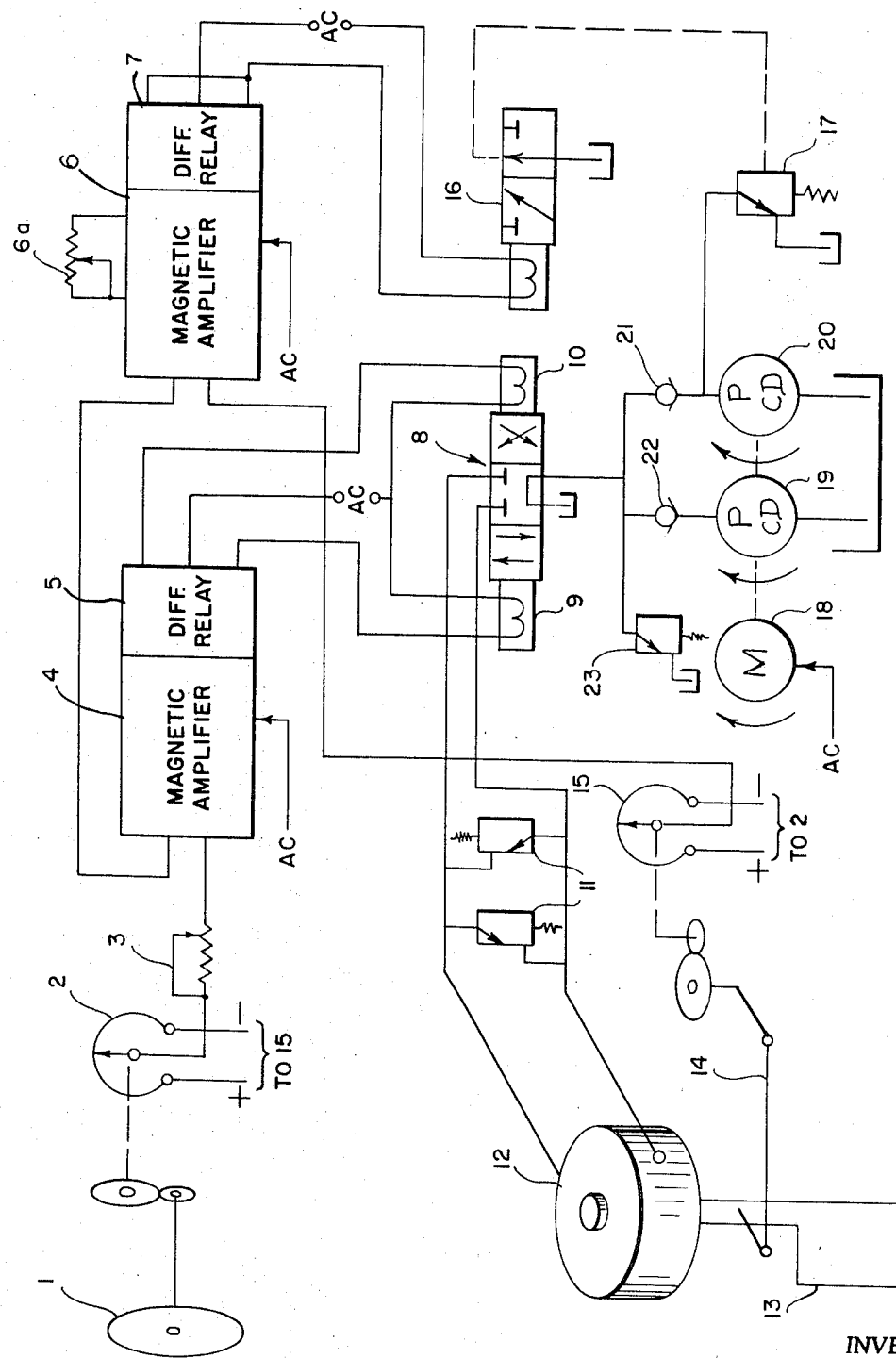
FIG. 1 is a schematic diagram of a variable rate steering control system in accordance with the invention.

Referring to FIG. 1, a ship's steering wheel 1 is drivingly coupled to command potentiometer 2. The ship's rudder 13 is driven by hydraulic rudder actuator 12, and is drivingly coupled as shown schematically at 14 to feedback potentiometer 15. Command potentiometer 2 and feedback potentiometer 15 are connected in a conventional manner to form a D.C. wheatstone bridge circuit (e.g., see U.S. Pat. No. 2,812,026). A variable resistor 3 is connected in the path of the D.C. signal so as to control the overall sensitivity of the servo loop. Also connected in the D.C. signal path is the control winding of push-pull magnetic amplifier 4, as is the control winding of identical magnetic amplifier 6. Magnetic amplifier 6, however, has a variable resistor 6a connected in the output of the amplifier so that a higher signal level is required to close its relay contacts 7 than is required to close one of the contacts of differential relay 5 of magnetic amplifier 4. Differential relay 5 controls solenoid coils 9 and 10 of hydraulic directional valve 8, while relay 7 controls the solenoid coil of cut-off valve 16, which in turn controls relief valve 17.

Electric motor 18 drives constant delivery pumps 19 and 20, pump 20 preferably being a high volume, constant delivery pump, while pump 19 is a lower volume, constant delivery pump. The pump outlets are connected to directional valve 8 downstream of one-way valves 21 and 22 as shown, and are also connected to relief valve 23. Additionally, valve 17 is connected to serve as a bypass valve for high volume pump 20. Directional valve 8, of course, directs the pump output or outputs to one side or the other of hydraulic motor or actuator 12 when solenoid coils 9 or 10 are energized, or moves to a third or normal position in which it disconnects the pump output from actuator 12. The fluid lines running from directional valve 8 to actuator 12 include relief valves 11 as shown.

In the operation of the system shown in FIG. 1, movement of steering wheel 1 causes a corresponding deflection of command potentiometer 2. The D.C. signal thus established is impressed on the control windings of magnetic amplifiers 4 and 6. The output of amplifier 4 will cause one of its relay contacts to close in response to the signal. The polarity of the input signal determines which relay contact will close, and consequently which solenoid coil of hydraulic directional valve 8 will be energized. Oil from the directional valve is directed to the rudder actuator 12, causing rudder movement, port or starboard, depending on the polarity of the potentiometer input signal. Followup potentiometer 15, linked to the rudder, develops an opposing signal to stop the rudder movement at a position depending on the magnitude of the command signal.

Due to the variable resistor 6a imposed in the output of amplifier 6, a higher signal level is required to close relay 7 and to energize the solenoid of the cut-off valve 16. In the unenergized condition, valve 16 is open, causing relief valve 17 to be "vented", which in turn causes the output of high volume, constant delivery pump 20 to be bypassed to the sump tank. When the solenoid is energized, valve 16 is closed and relief valve 17 then becomes operative, thus causing the output of pump 20 to combine with the output of the low volume, constant delivery pump 19 for a high rate of rudder movement. With pump 20 bypassed, the rudder moves at a low rate, which allows the rudder to be positioned with high accuracy or to be moved in very small increments.

For rudder orders of small magnitude, the relay contacts 7 of amplifier 6 will not close, as relatively high signal levels are required. But when the rudder command leads the actual rudder angle by 5° or more, amplifier 6 operates, and the rudder starts to move at a high rate as described above. As the rudder approaches its ordered position, the signal level drops enough to open contacts 7 of amplifier 6, thus slowing the rudder to its low rate, at approximately 3° before the final position of rest. Resistor 6a may be varied to adjust the cut-in and cut-out timing of high volume pump 20 to suit any operating conditions. Since both amplifiers are responding to the same signal, their outputs are inherently synchronized, and hence the timing adjustment is a simple procedure.

Figure 2:
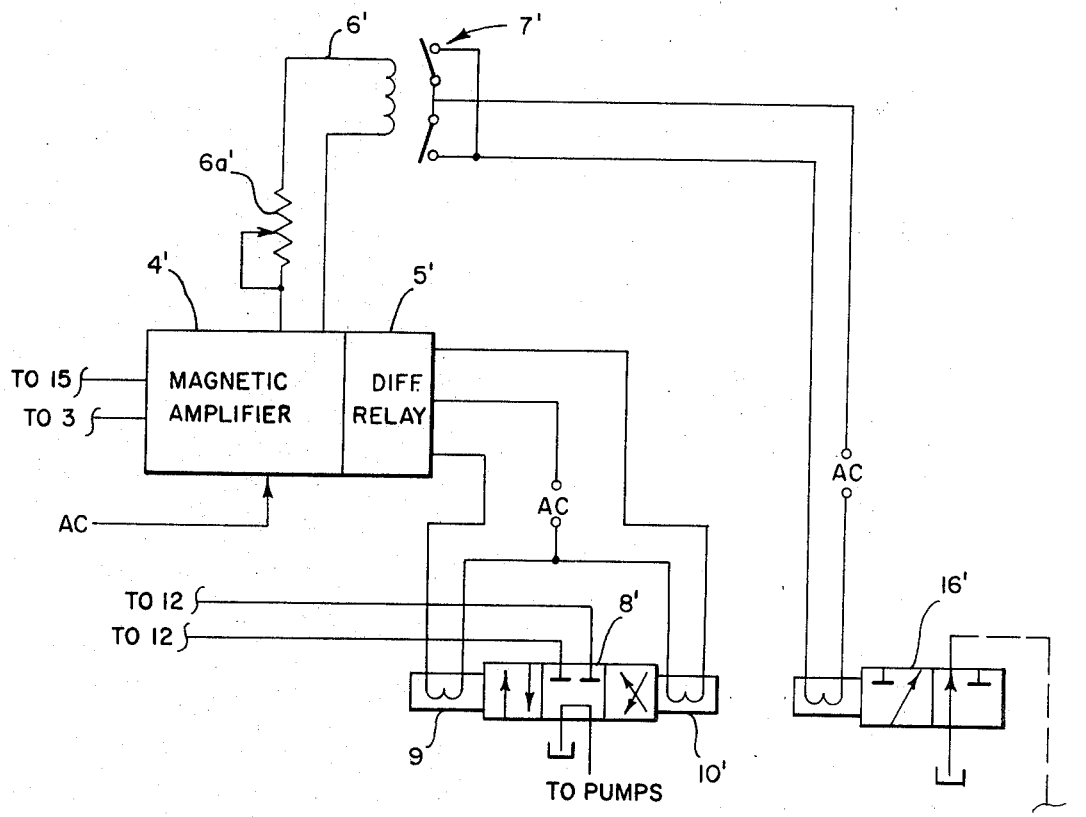
FIG. 2 is a schematic diagram of a modification of the system of FIG. 1, only the modified portion and the immediately surrounding portions being shown, since the system of FIG. 2 is otherwise identical to the system of FIG. 1.

Referring now to FIG. 2, the system of FIG. 2 is basically a simplified version of the system of FIG. 1. The corresponding parts and components in FIG. 2 are designated by primed reference characters corresponding to those of FIG. 1. Basically the system of FIG. 2 differs from that of FIG. 1 in using one amplifier instead of two. Thus amplifier 4' drives two relay coils in parallel, the extra relay coil being indicated at 6' in association with relay contacts 7'. Relay coil 6' is in series with variable resistor 6a', and hence requires a higher level of input signal before it will close relay contacts 7'. Operation of the system is identical to that shown in FIG. 1, except that amplifier 4' must have a higher gain to operate two relay coils at the same relative input signal level. Although the system of FIG. 2 is a simpler embodiment of the invention, the system of FIG. 1 is at present considered to constitute the preferred embodiment or best mode of carrying out the invention as applied to a steering control system.

Figure 3A:
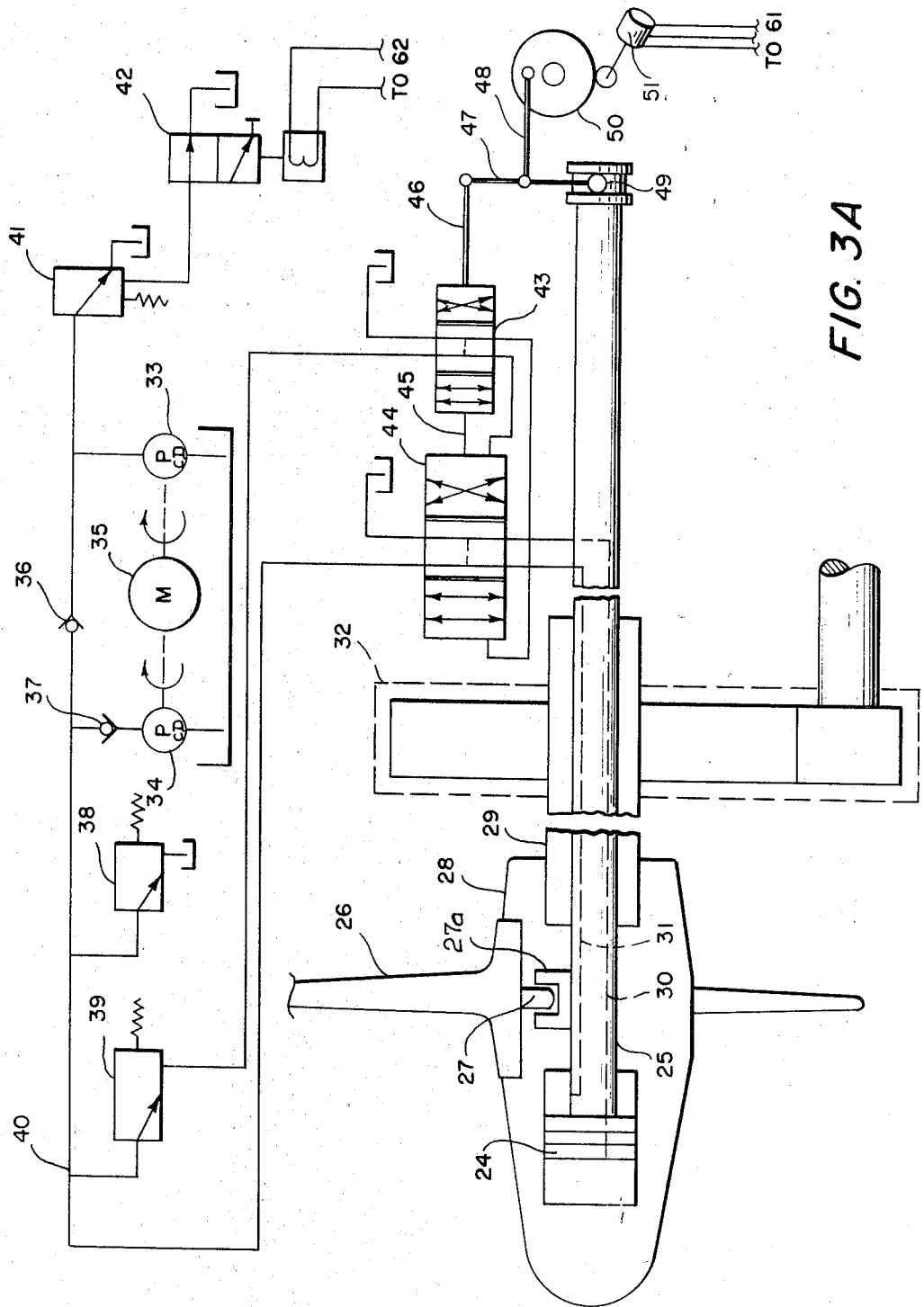

Referring now to the pitch control system shown in FIGS. 3A and 3B, the controllable pitch propeller is of a known type, and consists of hub 28, rotatable blades 26, pitch changing piston 24, crank pin 27, and slide yoke 27a. Propeller shaft 29 is hollow, and carries piston rod 25. The piston rod is provided with oil passages 30 and 31 to operate the piston 24, and extends through the gear reduction unit 32 to a differential lever 47 to obtain exact pitch position for servo followup. Low volume, constant delivery pump 34 and high volume, constant delivery pump 33 are driven by motor 35, and, as in the preceding steering system embodiment, have their outlets connected to a hydraulic directional valve indicated at 44. One-way valves 36 and 37, unloading relief valves 41, system relief valve 38 and solenoid controlled cut-off valve 42 are connected as in the steering system embodiment. Additionally, power fluid is tapped off at 40 and passes through reducing valve 39 to a pilot valve 43 which controls or hydraulically strokes servo directional valve 44. The spool of servo valve 44 is connected as schematically indicated at 45 to a ported sleeve surrounding the spool of pilot valve 43, as will be explained in greater detail in connection with FIG. 5. Pilot valve 43 is stroked or actuated by servo motor 51 which is drivingly coupled to gear member 50, which in turn is connected to differential lever 47 through a rod 48, the spool of pilot valve 43 being connected to the differential lever by rod 46. The differential lever is pivotally connected in a known manner at 49 to piston rod 25.

Servo motor 51 is controlled in a known manner by magnetic amplifier 60 and its differential relay 61 so as to stroke the pilot valve appropriately. Magnetic amplifier 60 is connected in a D.C. bridge circuit, two arms of which are formed by command potentimeter 53, and the other two arms of which are formed by feedback or followup potentiometer 52.

Also included in the bridge circuit is magnetic amplifier 59 with its relay contact 62. As in the preceding embodiment, magnetic amplifier 59 is arranged so as to close relay contact 62 only in response to a predetermined signal level greater than the signal level at which amplifier 60 closes relay contacts 61, and only when pitch command leads the actual pitch by 5°. This conveniently can be accomplished by suitable amplifier gain adjustment 59a. Relay contact 62 controls solenoid valve 42, which in turn controls relief or unloading valve 41, in the same manner as in the preceding steering system embodiment. Variable resistor 58 is incorporated in the bridge and controls the overall sensitivity of the servo loop.

Command potentiometer 53 is deflected in one direction or the other by control handle or lever 54 through a cam schematically indicated at 55 and a connection shown schematically at 57. To permit simultaneous control of propeller pitch and engine speed by control lever 54, the lever is also drivingly coupled to cam 69a, which actuates speed command potentiometer 68 through a follower connection indicated schematically at 69. The electric speed control signal developed by potentiometer 68 is impressed, as indicated schematically at 70, on engine governor 67 of a well known design, in order to maintain engine speed at the ordered level. As will be discussed in more detail subsequently, governor 67 is also capable of measuring engine overload, and of rotating a rheostat 66 in proportion to the magnitude of the overload.

By appropriate shaping of cams 55 and 69a, simultaneous programmed control of propeller pitch and engine speed by single control lever 54 is readily achieved. Such shaping is well within the skill of the art, given the desired operation, and accordingly the actual profiles are not shown in the drawings.

Figure 4:
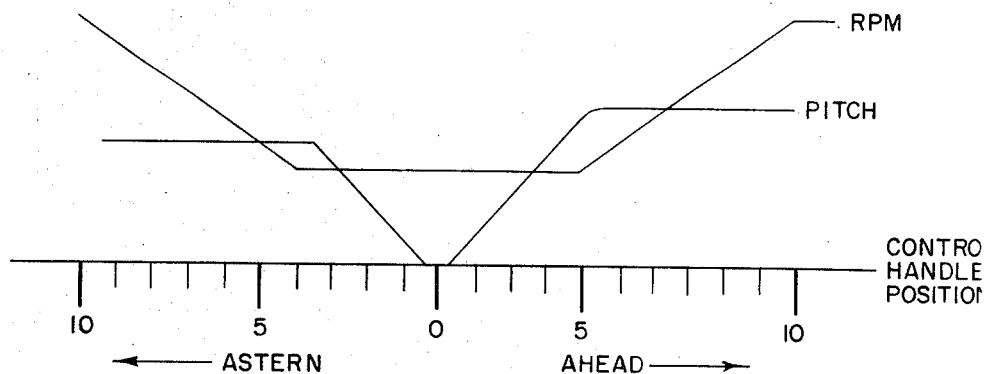
FIG. 4 is a graphic illustration of the relationships between propeller pitch setting and engine speed over the full range of positions of the control handle or lever in the system of FIGS. 3A and 3B.

A typical program of engine speed versus propeller pitch is illustrated in FIG. 4. In accordance with this program, movement of the control handle from its center position to full ahead would increase ahead pitch to full angle while maintaining the engine at idle speed, and then increase engine speed to full speed, or to a lower desired speed. The astern program is similar, except that astern pitch is normally limited to 80 percent of ahead pitch.

The operation of the basic system of FIG. 3A and 3B, as described thus far, will be readily apparent. Thus, when control handle 54 is moved to a desired position, cams 55 and 69a are rotated accordingly, and start the program of pitch and speed change. Cam 69a moves the tap of speed command potentiometer 68, and the resulting electrical signal is impressed on engine governor 67 to effect the speed change. Rotation of cam 55 moves the tap of pitch command potentiometer 53 in the appropriate direction, thus unbalancing the bridge network, and impressing a pitch change signal on the series connected control windings of amplifiers 59 and 60. Pitch servo motor 51 is responsive to amplifier 60 through differential relay 61 to obtain very sensitive pitch control. Servo motor 51 rotates gear 50, which in turn causes a pivotal deflection of differential lever 47 about point 49, stroking the spool of pilot valve 43. Pilot valve 43 in turn hydraulically strokes servo valve 44 to direct power fluid to piston 24 so as to change the pitch in the commanded sense. Because of the connection between the ported sleeve of the pilot valve and the spool of servo valve 44, the servo valve spool follows exactly the movement of the pilot valve spool. As the pitch changes, piston rod 25 moves, thus rotating differential lever 47 about its connection to rod 48, and returning the pilot valve spool to its normal closed position. The pilot valve in turn hydraulically strokes the spool of servo valve 44 to return it to its normal closed position. Thus, the propeller pitch is at the commanded angle, and is held in this position until the control handle is moved to a further position. The bridge of the command circuit is, of course, already again balanced by virtue of the followup movement of potentiometer 52 by servo motor 51 and gear 50.

The hydraulic oil supply is normally from low volume, constant delivery pump 34, which obtains a low rate of pitch change. This low rate minimizes the detrimental effect of inertia and time constants throughout the servo loop, and thus very precise pitch positioning is obtained. High volume pump 33 normally discharges to sump through unloading valve 41. When large pitch changes at a rapid rate are demanded to facilitate maneuvering, unloading valve 41 is closed by solenoid valve 42, thus causing the high volume output of pump 33 to combine with that of pump 34. An additional advantage in unloading the high volume pump is the saving in power loss caused by servo valve pressure drop. The solenoid of venting valve 42 is energized by amplifier 59 through relay 62 whenever pitch command leads the actual pitch by 5°. Likewise, the solenoid is de-energized when this lead angle is reduced to less than 5°. The signal level, of course, rises in proportion to the lead angle or servo error. The high volume pump is cut in and cut out at a predetermined lead angle by suitable amplifier gain adjustment.

As mentioned previously, governor 67 is capable of measuring engine overload, and of rotating rheostat 66 in proportion to the magnitude of the overload. By connecting rheostat 66 in series with one side of command potentiometer 53, pitch will automatically be reduced to relieve the engine overload, since the rheostat will automatically bias the command circuit in a pitch reducing sense. With the rheostat 66 connected in the command circuit as illustrated in FIG. 3B, it would be effective to reduce pitch in only one mode of operation, for instance, when the propeller is in an ahead pitch condition. To render it effective during astern pitch operation, it should be electrically relocated so as to be in series connection with the over side of command potentiometer 53. In the illustrated embodiment, this is accomplished automatically by providing an additional cam 56 which is driven by control handle 54, and is effective upon movement of the control handle to, for instance, an astern pitch position to automatically close switch 65, thus energizing solenoid 64 and its associated relay contacts 63 to relocate rheostat 66 electrically on the opposite side of command potentiometer 53.

Figure 5:
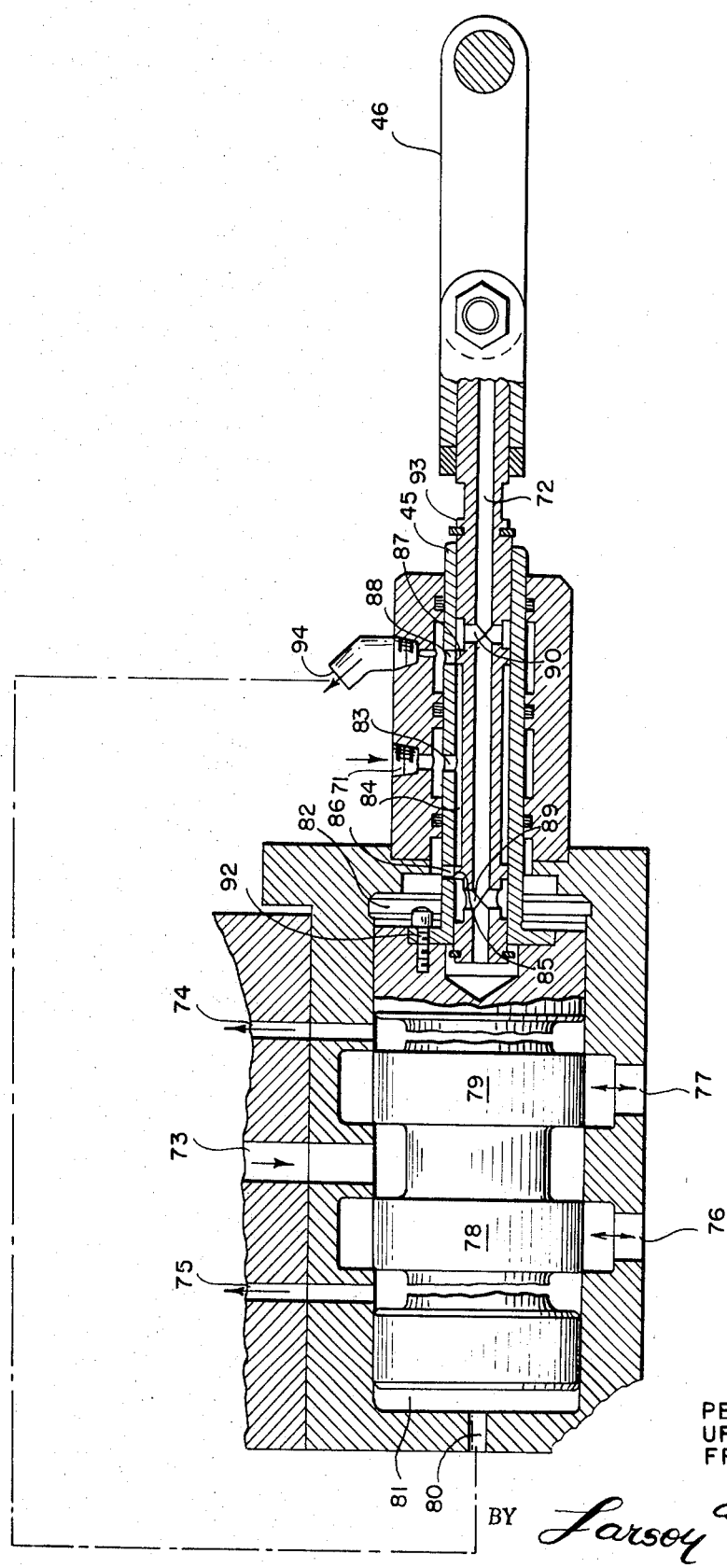
FIG. 5 is a cross section illustrating the basic features of the improved directional valve which is shown schematically in FIG. 3A, and which preferably is used in the system of FIGS. 3A and 3B.

The details of the improved and preferred pilot valve and servo valve arrangement are shown in FIG. 5. As shown in FIG. 5, the servo valve spool has lands 78 and 79 which are effective to direct power fluid from inlet 73 to one or the other of ports 76 and 77, while venting one of these ports to sump through vent connections 74 and 75. The servo valve spool is hydraulically stroked by the admission of pressure fluid to space 81 through port 80 or to space 82 through port 86 under the control of the pilot valve. The spool of the pilot valve is mechanically stroked by the connecting member indicated schematically at 46. Sleeve 45 of the pilot valve is mechanically connected to the spool of the servo valve by bolts or the like, one of which is shown at 92. Pilot fluid for stroking the servo valve spool is supplied to the pilot valve at inlet port 71, and passes through port 83 in sleeve 45 to an annular space 84 which is boundaried at its ends by lands 85 and 87 of the pilot spool. Lands 85 and 87 control ports 86 and 88, respectively, in sleeve 45. Ports 89 and 90 in pilot spool 93 communicate with an interior venting passage 72 which discharges to sump. When assembled, the passage 94 is connected with port 80 of space 81.

In operation, when pilot spool 93 is stroked by connection 46 to the left as viewed in FIG. 5, land 85 moves to the left, opening port 86 in sleeve 45, and admitting pilot fluid from annular space 84 to the space 82. At the same time, land 87 moves to the left, covering port 88, and opening space 81 of the servo valve spool to sump through port 80, a connecting conduit to passage 94, ports 88 and 90, and discharge passage 72. Thus the servo valve spool is hydraulically stroked to the left as viewed in FIG. 5. As the servo spool and hence ported sleeve 45 move to the left, ports 86 and 88 are closed by the movement of the sleeve 45, and hence the servo spool follows precisely the initial movement of the pilot spool 93, and is held in the new position corresponding to the stroked position of the pilot spool.

When the pilot spool 93 is returned to the right through the action of the differential lever arrangement, space 82 is connected to sump, and space 81 is connected to the pilot fluid, thus hydraulically stroking the servo spool to the right, and stopping it at a new position corresponding exactly to the new position of the pilot spool 93.

From the foregoing description of exemplary embodiments, it is believed that the arrangement, operation and advantages of the basic variable rate actuator system will be easily understood by persons skilled in the art, as will the arrangements, operation and advantages of the particular improved steering system and the pitch and speed control system with their additional improved features.

The various components of the illustrated systems are either commercially available or easily fabricated. For instance, load sensing governor 67 is of a well known design manufactured by Woodward Governor Company, and designated as Model PG-PL. Unloading valves 17 and 41 can conveniently be of the type illustrated in Kent's Mechanical Engineers' Handbook, 12th Edition, Design and Production, pp. 13–16, FIG. 32. The programmed pitch and speed control cams are easily fabricated and shaped appropriately for the program desired in a particular system. In this respect, it is to be noted that in actual practice the cams preferably are not mechanically connected directly to the control lever, but are driven by a servo loop which in turn is controlled by the control lever. The servo loop controls the rate of rotation of the cams so as to avoid the possibility of, for instance, the speed change departing from its programmed relationship with the pitch change. Thus, in the event of a hard-over signal from full astern to full ahead, the engine speed might be brought back to full before the pitch actuator could complete the pitch change, if the rate of rotation of the cams were not controlled. By using a servo loop, the cams can be moved just fast enough to maintain, for instance, a 10° pitch error. This would keep the hydraulic system at high capacity, but would not allow the cams to run away from the pitch servo.

It will be readily apparent to those skilled in the art that the exemplary preferred embodiments described and illustrated herein are susceptible of various modifications, rearrangements, etc., without departing from the spirit and substance of the invention. Accordingly, it is to be understood that the disclosed embodiments are illustrative rather than limiting, and that the scope of the invention is as set forth in the appended claims construed in the light of the foregoing descriptions and illustrations.

We claim:

1. A variable rate electrohydraulic actuator system comprising a hydraulic motor, a motor control electric circuit for carrying a variable motor command signal indicative of a commanded operation of said motor, first and second hydraulic pumps, first pump control means, including amplifier means, operatively associated with said electric circuit and responsive to said command signal for directing power fluid from said first pump to said motor in response to a command signal indicative of commanded operation of a relatively low magnitude, and second pump control means, including amplifier means, operatively associated with said electric circuit and continuously subjected to said command signal, but relatively less sensitive thereto than said first pump control means, for directing power fluid from said second pump to said motor only in response to and during a predetermined command signal indicative of a commanded operation of a relatively greater magnitude and only when the output of said first pump is directed to said motor, said second pump control means being substantially insensitive to said command signal indicative of a commanded operation of a relatively low magnitude.

2. A system as claimed in claim 1 wherein said first and second pumps are constant delivery pumps, and said first and second pump control means include means for bypassing the power fluid from each respective pump when the power fluid from that pump is not directed to said motor.

3. A system as claimed in claim 2 wherein said motor control circuit includes operator actuated motor command means, and means for generating a command signal in response to a relative difference between a commanded motor condition and the actual motor condition.

4. A system as claimed in claim 3 wherein said means for generating a command signal comprises a command potentiometer operatively coupled to said operator actuated motor command means and a feedback-followup potentiometer operatively coupled to said hydraulic motor.

5. A system as claimed in claim 1 wherein said first and second pump control means respectively include magnetic amplifiers of different output sensitivities.

6. A system as claimed in claim 5 wherein said magnetic amplifiers have their inputs connected in series in said motor control electric circuit.

7. A system as claimed in claim 1 wherein said electric circuit carries a variable motor command signal indicative of a commanded direction and magnitude of operation of said motor, and said first pump control means includes a selector valve for directing power fluid to said motor so as to operate the motor in the commanded direction.

8. A system as claimed in claim 1 wherein said hydraulic motor comprises a hydraulic rudder actuator operatively coupled to the rudder of a marine vessel; and wherein said electric circuit includes means operatively coupled to the steering control and to the rudder for establishing a net command signal the polarity of which is indicative of the commanded direction of rudder movement and the magnitude of which is indicative of the commanded extent of rudder movement; and wherein said first pump control means includes a selector valve for bypassing the output of said first pump or connecting the output to one side or the other of said rudder actuator, a magnetic amplifier connected in said circuit, and a differential relay controlled by said magnetic amplifier for actuating said selector valve, said magnetic amplifier and said differential relay in combination being relatively sensitive to the net command signal in said circuit; and wherein said second pump control means comprises valve means for bypassing the output of said second pump or combining it with the output of said first pump, a magnetic amplifier connected in said circuit, and a relay controlled by the last mentioned amplifier for actuating said last mentioned valve, said last mentioned amplifier and relay in combination being relatively insensitive to the net command signal in said circuit so as to combine the output of said second pump with said first pump only when the net command signal is indicative of a relative large extent of commanded rudder movement.

9. A system as claimed in claim 8 wherein said two magnetic amplifiers have their inputs connected in series in said circuit.

10. A system as claimed in claim 1 wherein said hydraulic motor comprises a pitch changing actuator operatively coupled to the pitch changing linkage of a variable pitch propeller of a marine vessel; and wherein said electric circuit includes means operatively coupled to a pitch control member and to the actuator for establishing a net command signal the polarity of which is indicative of the commanded sense of pitch change and the magnitude of which is indicative of the extent of pitch change; and wherein said first pump control means includes a selector valve for bypassing the output of said first pump or directing the output to one side or the other of said actuator, a magnetic amplifier connected in said circuit, and a differential relay controlled by said magnetic amplifier for actuating said selector valve, said magnetic amplifier and said differential relay in combination being relatively sensitive to the net command signal in said circuit; and wherein said second pump control means includes valve means for bypassing the output of said second pump or combining it with the output of said first pump, a magnetic amplifier connected in said circuit, and a relay controlled by said last mentioned amplifier for actuating said last mentioned valve, said last mentioned amplifier and relay in combination being relatively insensitive to the net command signal in said circuit so as to combine the output of said second pump with said first pump only when the net command signal is indicative of a relatively large extent of commanded pitch change.

11. A variable rate electrohydraulic actuator system for use in actuating a control member of a marine vessel, comprising a hydraulic motor, first and second constant delivery pumps, a common signal source for establishing a variable motor command electrical signal, and means operatively connected to said common signal source but selectively responsive to said variable motor command signal for selectively directing the output of one or both or neither of said pumps to said hydraulic motor, depending upon the particular command signal established by said common signal source, thereby to operate said motor selectively at variable rates, said means operatively connected to said common signal source including two amplifiers in circuit with said common signal source, one for controlling each pump, and amplifier responsive means operatively combined with each amplifier for selectively directing the output of the associated pump to said motor or to bypass, one of said amplifiers and its amplifier responsive means being sensitive to said variable control signal of a certain range, and the other of said amplifiers and its amplifier responsive means being sensitive to said variable control signal only in a portion of said range different from the portion to which said one amplifier is initially responsive.

12. A system as claimed in claim 11 wherein said amplifiers have their inputs series connected in circuit with said common signal source.

13. A system as claimed in claim 12 wherein said common signal source comprises motor position command means and motor position sensing means for establishing a motor command electrical signal indicative of the difference between the commanded position and the sensed position, and wherein said other amplifier and its amplifier responsive means are sensitive only to signals indicative of a relatively large difference.

14. A system as claimed in claim 13 wherein said motor position command means and said motor position sensing means comprise potentiometers, each of which forms two arms of a d.c. bridge network, and the taps of which are series connected, said amplifiers being located in the series connection between said taps.

15. A system as claimed in claim 14 wherein one of said amplifier responsive means comprises a differential relay and a selector valve for directing the output of said pumps to one side or the other of said motor in response to the polarity of the variable electric signal.

16. A system as claimed in claim 11 wherein said hydraulic motor is a propeller pitch actuator operatively coupled to a variable pitch propeller for a marine vessel, and wherein said common signal source comprises a circuit including pitch command means and pitch sensing means for establishing a pitch changing electrical signal indicative of the difference between the commanded pitch and the sensed pitch, further comprising means adapted to be operatively coupled to a propulsion engine for sensing the load condition thereon and biassing the circuit in the pitch reducing sense in response to an overload condition.

17. A system as claimed in claim 16 wherein said pitch command means and said pitch sensing means comprise two potentiometers in a bridge arrangement in said circuit, each potentiometer forming two arms of the bridge and the taps of the potentiometers being series connected, and said means for biassing said circuit comprises a rheostat, and said means operatively connected to said signal source is responsive also to the polarity of said variable motor command signal so as to direct the selected pump output to the motor for driving it in the pitch increasing or decreasing direction for either ahead or astern propulsion, further comprising means for connecting said rheostat in said bridge at different electrical locations so that it will bias the circuit in a pitch reducing sense in response to an engine overload condition regardless of whether the propeller has astern or ahead pitch.

18. A system as claimed in claim 17 wherein said pitch command potentiometer is operatively coupled to a control member having ahead and astern positions, and said means for connecting said rheostat in said bridge comprises switch means for changing the electrical location of said rheostat in response to movement of said control member from either of said positions to the other.

19. A system as claimed in claim 17 wherein said rheostat is selectively series connected in one or the other of the two arms formed by one of said potentiometers.

20. A system as claimed in claim 11 wherein said means for selectively directing the output of said pumps includes a compound distributor valve means, said valve means comprising a main servo valve having a movable member for selectively connecting the output to one side or the other of said motor so as to drive the motor in a given direction, a pilot valve having a movable member for directing actuating fluid selectively to said servo valve to move said movable member of said servo valve so as in turn to direct the output to the selected side of the hydraulic motor, and means for stopping the movement of said movable member of said servo valve when it has moved a distance corresponding to the movement of the movable member of said pilot valve.

21. A system as claimed in claim 20 wherein said movable member of said servo valve comprises a servo spool, and said servo spool is reciprocable in a ported servo valve body in response to actuating fluid directed selectively to the ends of said servo spool by said pilot valve, and wherein said movable member of said pilot valve comprises a pilot spool, and said pilot spool is reciprocable in a ported sleeve in response to said motor command signals, said ports in said sleeve being in communication with the ends of said servo spool so as to direct actuating fluid thereto and therefrom when opened by said pilot spool, and wherein said means for stopping the movement of said servo spool comprises means coupling said servo spool to said ported sleeve for common movement, whereby a port in said sleeve which is opened by movement of said pilot spool will be closed upon the resulting corresponding movement of said servo spool and said sleeve.

22. A variable rate electrohydraulic actuator system for use in actuating a control member of a marine vessel, comprising a hydraulic motor, first and second constant delivery pumps, a common signal source for establishing a variable motor command electrical signal, and means operatively connected to said common signal source but selectively responsive to said variable motor command signal for selectively directing the output of one or both or neither or said pumps to said hydraulic motor, depending upon the particular command signal established by said common signal source, thereby to operate said motor selectively at variable rates, said means operatively connected to said common signal source including amplifier means having two outputs of different output sensitivities.